Patented July 12, 1949

2,476,251

UNITED STATES PATENT OFFICE 2,476,251

PROCESS FOR PASTEURIZATION AND ENZYME INACTIVITY OF FRUITS BY ELECTRONIC HEATING

Theodore Lowell Swenson, Berkeley, Calif., assignor to the United States of America as represented by the Secretary of Agriculture No Drawing. Application April 19, 1946,
Serial No. 663,336

8 Claims. (Cl. 99—155)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

The need for a process by which fresh fruit juices, especially citrus fruit juices, could be prepared to hold and maintain their natural flavors has long been felt. Processes have been developed which give reasonably satisfactory products for such fruits as grapes and apples, but it has been impossible by previous methods to maintain in the juices of citrus fruits, especially oranges, the delicacy and richness of flavor found in the fresh fruit or in the freshly expressed juice.

Among the objects of this invention is the provision of fruit juices, especially those derived from citrus fruits, such as oranges, grapefruit, and lemons, that retain their fresh fruit flavors and other desirable properties for prolonged periods of storage.

These objects are attained, in accordance with this invention, by subjecting the whole fruit, before the outer coating or skin has been ruptured, to the action of a high frequency electrostatic field. This treatment is promptly followed by cooling the fruit and then extracting the juice therefrom, or subjecting it to other processing procedures. This preliminary treatment results in the inactivation of the enzymes and the pasteurization of the juice in the absence of air. Enzyme and bacterial activities are the two principal deterioration factors, and they are accelerated in the presence of air.

Although the importance of the inactivation of enzymes in fruits, vegetables and their juices may have been recognized in the prior art, all previous methods are directed toward either treatment of cut portions of fruits or vegetables by steam blanching or treatment of their expressed juices by de-aeration and flash pasteurization. Inevitably this permits the active enzymes to come into intimate contact with their substratum, upon which they are free to act until inactivated. The result is deterimental to the taste and other desirable properties of the fruit juice to a degree dependent upon the time and speed of such action. In consequence, the preparation of foods, such as fruit juices, especially citrus fruit juices, that retain the flavor and other desirable characteristics of fresh fruit during processing and storage has not been possible.

This present invention differs from the prior art in that inactivation of enzymes and pasteurization are performed on the whole fruit in situ. The enzymes and their substratum are not brought into intimate contact, and air is entirely excluded. Furthermore, the inactivation of the enzyme systems is accomplished in a few seconds, thus disturbing equilibrium a minimum and permitting processing and storing in the original fresh condition.

When the whole fruit is brought into the high frequency electrostatic field in accordance with this invention, it is heated uniformly and almost instantaneously to a temperature sufficient to inactivate the enzyme systems and complete pasteurization. It is then cooled by immersion in ice water or in any other convenient manner, and the juice may then be expressed or other processes employed by the usual methods. Inasmuch as the enzymes have been completely inactivated, it is not necessary to take any special precautions for the exclusion of air, and it is only necessary to employ such sanitary measures as would ordinarily be taken to prevent bacterial contamination.

The following example will illustrate the invention in more detail:

Whole oranges were treated in a field of high frequency electrical energy at a frequency of about 40 megacycles per second for 2 minutes. The internal temperature of the oranges averaged about 180° F. The treated fruit was next immersed in ice water for 15 minutes which reduced the temperature to about 25° C. The fruit was then halved and burred on a commercial burring machine. The resulting juice was not significantly different from the juice of untreated fruit in flavor and palatability. Tests for the inactivation of the pectin esterase showed 100 percent destruction in the suspended matter of the juice from the treated oranges.

Other fruits and vegetables, such as grapefruit, limes, tomatoes, pineapples, and so forth, may be similarly treated and equally effective results are obtained, especially in the case of citrus fruits. Oranges were used because of their notoriously delicate flavor that is easily destroyed. The use of oranges in the above example is illustrative only. It is to be understood therefore that the invention is not limited in scope by the example, but is applicable to any fruit or vegetable wherein it is desired to inhibit enzyme action before applying the usual processing procedures, irrespective of whether the final product is in a fresh form or in a cooked form. Thus, the invention may be applied to any fruit or vegetable including pears, peaches, apricots, apples, potatoes, carrots, bananas, corn, asparagus, and so forth.

Having thus described my invention, I claim:

1. The method of preparing fruit juices from whole fruit comprising first subjecting the whole raw fruit to rapid heating action in a high frequency electrostatic field for a period sufficient to pasteurize the juice and inactivate the enzymes therein but not to cook it, then promptly cooling the whole raw fruit and expressing the juice therefrom, whereby said juice will retain its fresh fruit flavor in storage for prolonged periods.

2. The method of preparing fruit juices from citrus fruit comprising first subjecting the whole raw citrus fruit to rapid heating action in a high frequency electrostatic field for a period sufficient to pasteurize the juice and inactivate the enzymes therein but not to cook it, then promptly cooling the whole raw fruit and expressing the juice therefrom, whereby said juice will retain its fresh fruit flavor in storage for prolonged periods.

3. The method of preparing orange juice from oranges comprising first subjecting the whole raw oranges to rapid heating action in a high frequency electrostatic field for a period sufficient to pasteurize the juice and inactivate the enzymes therein, then promptly cooling the whole raw fruit and expressing the juice therefrom, whereby said juice will retain its fresh fruit flavor in storage for prolonged periods.

4. The method of preparing grapefruit juice from grapefruit comprising first subjecting the whole raw grapefruit to rapid heating action in a high frequency electrostatic field for a period sufficient to pasteurize the juice and inactivate the enzymes therein, then promptly cooling the whole raw fruit and expressing the juice therefrom, whereby said juice will retain its fresh fruit flavor in storage for prolonged periods.

5. The method of preparing lemon juice from lemons comprising first subjecting the whole raw lemons to rapid heating action in a high frequency electrostatic field for a period sufficient to pasteurize the juice and inactivate the enzymes therein, then promptly cooling the whole raw fruit and expressing the juice therefrom, whereby said juice will retain its fresh fruit flavor in storage for prolonged periods.

6. In the processing of citrus fruit, the steps of subjecting the whole raw citrus fruit to rapid heating action of a field of high frequency electrical energy for a period sufficient to inactivate the enzymes therein but not to cook the fruit, followed by promptly cooling the whole raw product to halt the heating, whereby the juice in said fruit will retain its fresh fruit flavor in storage for prolonged periods.

7. The process of claim 6 in which fruit is heated for a period of about two minutes at about 180° F.

8. The method of preparing orange juice comprising placing the whole raw orange in a high frequency electric field whereby it is subjected to rapid heating for a period of about two minutes at about 180° F., to inactive the enzymes therein, followed by promptly cooling the whole raw fruit, and thereafter expressing the juice therefrom.

THEODORE LOWELL SWENSON.

REFERENCES CITED

The following references are of record in the file of this patent:

UNITED STATES PATENTS

| Number | Name | Date |
|---|---|---|
| 1,945,867 | Rawls | Feb. 6, 1934 |
| 1,972,050 | Davis | Aug. 28, 1934 |
| 1,992,515 | Uhlmann | Feb. 26, 1935 |
| 2,114,345 | Hayford | Apr. 19, 1938 |

FOREIGN PATENTS

| Number | Country | Date |
|---|---|---|
| 3,914 | Great Britain | 1900 |
| 23,893 | Great Britain | 1900 |

OTHER REFERENCES

"Heat Treating Shell Eggs," by Barott et al., U. S. Egg and Poultry Magazine, July 1943, page 320.